(12) United States Patent
Bala et al.

(10) Patent No.: US 12,437,236 B2
(45) Date of Patent: Oct. 7, 2025

(54) SYSTEMS AND METHODS FOR PROVIDING PROMPTS ON AN ELECTRONIC DEVICE

(71) Applicant: MatrixCare, Inc., Bloomington, MN (US)

(72) Inventors: Krishna Bala, New York, NY (US); Chirag Narendra Kular, Eden Prairie, MN (US); Adhiraj Ganpat Prajapati, St. Louis Park, MN (US); Barrett Gordon Selfridge, Floral Park, NY (US)

(73) Assignee: MatrixCare, Inc., Bloomington, MN (US)

( * ) Notice: Subject to any disclaimer, the term of this patent is extended or adjusted under 35 U.S.C. 154(b) by 714 days.

(21) Appl. No.: 17/779,459

(22) PCT Filed: Nov. 23, 2020

(86) PCT No.: PCT/US2020/061881
§ 371 (c)(1),
(2) Date: May 24, 2022

(87) PCT Pub. No.: WO2021/108333
PCT Pub. Date: Jun. 3, 2021

(65) Prior Publication Data
US 2023/0004865 A1    Jan. 5, 2023

Related U.S. Application Data

(60) Provisional application No. 62/940,349, filed on Nov. 26, 2019.

(51) Int. Cl.
*G06N 20/00*    (2019.01)

(52) U.S. Cl.
CPC ................................ *G06N 20/00* (2019.01)

(58) Field of Classification Search
CPC ...................................................... G06N 20/00
See application file for complete search history.

(56) References Cited

U.S. PATENT DOCUMENTS 10,027,614 B1 *   7/2018   Agrawal ............... H04M 1/724
2010/0188230 A1 * 7/2010   Lindsay ................. G16H 40/63
                                                                715/866

(Continued)

FOREIGN PATENT DOCUMENTS

WO         2018165439 A1    9/2018

OTHER PUBLICATIONS

International Search Report in International Patent Application No. PCT/US2020/061881 mailed Mar. 31, 2021 (3 pp.).

(Continued)

*Primary Examiner* — Asher D Kells
(74) *Attorney, Agent, or Firm* — Nixon Peabody LLP (57) ABSTRACT

Methods and devices include determining that a prompt is to be displayed on a display of a user device to present information to a user of the user device, to receive an input from the user of the user device, or a combination. The methods and devices further include determining a classification of the prompt based, at least in part, on the information to be presented, the input to be received, context associated with current use of the user device by the user, or a combination thereof. The methods and devices further include causing, at least in part, a presentation of a graphical user interface element on the display of the user device based, at least in part, on the classification of the prompt.

26 Claims, 6 Drawing Sheets

(56) References Cited

U.S. PATENT DOCUMENTS

| | | | |
|---|---|---|---|
| 2014/0215494 A1* | 7/2014 | Kim | G06Q 10/109 719/318 |
| 2014/0282003 A1* | 9/2014 | Gruber | G06F 3/167 715/727 |
| 2016/0307100 A1* | 10/2016 | Cooper | G06F 3/0484 |
| 2017/0102855 A1* | 4/2017 | Kwon | G06F 3/04847 |
| 2017/0185650 A1* | 6/2017 | Vainas | G06F 16/24575 |
| 2017/0255868 A1* | 9/2017 | Gelinas | G06N 20/00 |
| 2017/0311903 A1 | 11/2017 | Davis et al. | |
| 2017/0316320 A1* | 11/2017 | Jamjoom | G06Q 10/109 |
| 2018/0352534 A1* | 12/2018 | Blahnik | H04L 67/55 |
| 2019/0188552 A1* | 6/2019 | Andersen | H04L 67/10 |
| 2019/0235936 A1* | 8/2019 | Murdock | H04W 68/02 |
| 2019/0289124 A1* | 9/2019 | Yalamanchili | H04M 1/72484 |
| 2019/0379627 A1* | 12/2019 | Wang | H04L 51/224 |
| 2020/0192566 A1* | 6/2020 | Cinek | H04W 68/005 |
| 2021/0018327 A1* | 1/2021 | Mitra | G06F 1/163 |
| 2023/0068793 A1* | 3/2023 | Bazargan | G16H 40/67 |
| 2024/0106694 A1* | 3/2024 | Koohmarey | H04L 41/16 |

OTHER PUBLICATIONS

Written Opinion in International Patent Application No. PCT/US2020/061881 mailed Mar. 31, 2021 (6 pp.).

International Preliminary Report on Patentability in International Patent Application No. PCT/US2020/061881 dated Feb. 17, 2022 (8 pp.).

* cited by examiner

SYSTEMS AND METHODS FOR PROVIDING PROMPTS ON AN ELECTRONIC DEVICE

CROSS-REFERENCE TO RELATED APPLICATIONS

This application is a U.S. National Stage of International Application No. PCT/US2020/061881, filed Nov. 23, 2020, which claims the benefit of and priority to U.S. Provisional Application No. 62/940,349, filed Nov. 26, 2019, which is hereby incorporated by reference herein in its entirety.

TECHNICAL FIELD

The present disclosure relates generally to systems and methods for providing prompts on an electronic device, and more particularly, to systems and methods for engaging a user of an electronic device with messages that provide appropriate details such that the messages have a lower risk of being ignored.

BACKGROUND

Computers and computing devices are ubiquitous in today's society. Most jobs in an office space require the use of computers, smart phones, global positioning devices, tablets, etc. Furthermore, smart phones and mobile computers like tablets and laptops allow individuals to take their work outside of the office space. Computing devices are not only used in work environments, but also aid in everyday communication and tasks outside of work. For example, a shopping list can be stored on a mobile phone, reminders to go grocery shopping can be set on the mobile device, reminders on when a business opens or closes can be set on the mobile device, etc. Humans have offloaded many tasks to computing devices, becoming ever reliant on these devices. As humans continue to become more reliant on these devices, they essentially become numb to certain aspects of using those computing devices. When a computing device does not function properly or does not interface well with its human user, then the human user can suffer productivity losses, can forget important deadlines, can fail to prioritize important projects, etc. The present disclosure is directed to solving problems related to interface issues between humans and computing devices and other problems.

SUMMARY

According to some implementations of the present disclosure, a method includes determining that a prompt is to be displayed on a display of a user device to present information to a user of the user device, to receive an input from the user of the user device, or a combination thereof. The method further includes determining a classification of the prompt based, at least in part, on the information to be presented, the input to be received, context associated with current use of the user device by the user, or a combination thereof. The method further includes causing, at least in part, a presentation of a graphical user interface element on the display of the user device based, at least in part, on the classification of the prompt.

According to some implementations of the present disclosure, a device includes memory including one or more computer-readable instructions and a control system having one or more processors. The one or more processors are configured to execute the one or more computer-readable instructions to determine an initiation of a prompt to be displayed on a display of a user device to present information to a user of the user device, to receive an input from the user of the user device, or a combination thereof. The one or more processors are configured to execute the one or more computer-readable instructions to further determine a classification of the prompt based, at least in part, on the information to be presented, the input to be received, context associated with current use of the user device by the user, or a combination thereof. The one or more processors are configured to execute the one or more computer-readable instructions to further cause, at least in part, a presentation of a graphical user interface element on the display of the user device based, at least in part, on the classification of the prompt.

According to some implementations of the present disclosure, a method includes determining that a prompt is to be provided to a user of a user device. The method further includes determining a classification of the prompt based, at least in part, on information associated with the prompt, a requirement for a response by the user to the prompt, context associated with current use of the user device by the user, or a combination thereof. The method further includes causing, at least in part, a providing of an alert at the user device based, at least in part, on the classification of the prompt.

According to some implementations of the present disclosure, a device includes memory including one or more computer-readable instructions and a control system having one or more processors. The one or more processors are configured to execute the one or more computer-readable instructions to determine an initiation of a prompt to be provided to a user of a user device. The one or more processors are configured to execute the one or more computer-readable instructions to further determine a classification of the prompt based, at least in part, on information associated with the prompt, a requirement for a response by the user to the prompt, context associated with current use of the user device by the user, or a combination thereof. The one or more processors are configured to execute the one or more computer-readable instructions to further cause, at least in part, a providing of an alert at the user device based, at least in part, on the classification of the prompt.

The above summary is not intended to represent each embodiment or every aspect of the present invention. Additional features and benefits of the present invention are apparent from the detailed description and figures set forth below.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Individuals can grow to rely on computing devices (e.g., mobile phones, tablets, smart watches, laptops, desktops, or a combination thereof) to perform required or important functions throughout their day. The stronger an individual relies on a computing device to keep track of schedules, monitor progress, and/or provide status updates, the more likely the individual will be in despair when the computing device does not provide adequate warnings that engage the individual. The individual might miss important meetings, miss important status updates, etc. Typical alerting systems are fixed in behavior or prompt users with a limited set of pre-configured message options. In contrast to these alerting systems, the present disclosure provides methods of increasingly engaging a user to pay attention to details of alerts, prompts, and messages provided by a computing device. An advantage to increased engagement includes avoiding errors resulting from the user ignoring a warning or not paying a required level of detailed attention to the warning due to alert-fatigue.

Some implementations of the present disclosure provide an alerting system for smart prompts that identify appropriate timing to display important information early in a workflow. The alerting system can implement the proactive alerting so that a user can acknowledge and/or verify the displayed information. The proactive alerting also allows the user to discern or obtain information by varying an intrusion level of alerts and/or prompts provided by the alerting system. The intrusion level can be based on at least user behavior. For example, in some implementations, if the alerting system determines that the user is not providing adequate consideration to displayed information in a prompt, the alerting system can increase the intrusive level of the prompt. For another example, in some implementations, if the alerting system has detected that a user has historically dismissed a particular prompt or alert or a particular class of prompts or alerts without changing the outcome, the alerting system can respond by giving that particular prompt or alert or that particular class of prompts or alerts less importance (e.g., to decrease the intrusive level of the prompt). Adequate consideration can sometimes be determined based on the prompt requiring feedback from the user.

Proactive alerting according to some implementations of the present disclosure provides advantages. For example, by having a user pay attention to information contained in prompts, the user can reduce errors in a workflow. Furthermore, the user can avoid actions that can be potentially be a violation or that can be in contradiction to a positive outcome considering the workflow. For example, proactive alerting can prevent a nurse from forgetting to change sheets of a patient whose sheets are changed infrequently. Another advantage to proactive alerting is that the user can save time by avoiding to redo a task in a workflow if the task is performed well in a first instance.

Figure 1:
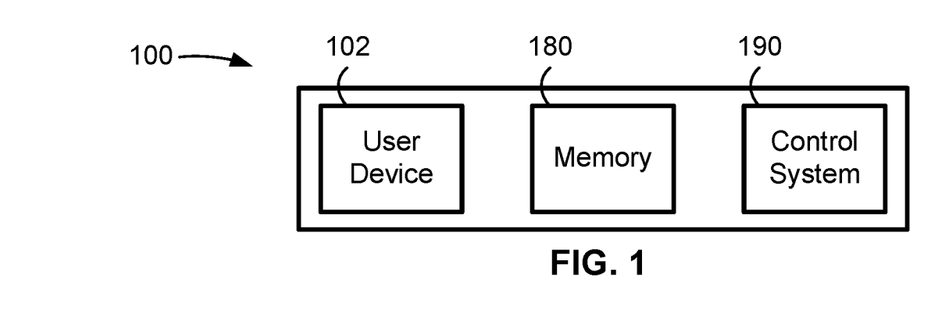
FIG. 1 is a block diagram of a system for providing prompts, according to some implementations of the present disclosure.

Referring to FIG. 1, a system 100 includes a user device 102, a memory device 180, and a control system 190. To simplify discussion, the singular form will be used for all components identified in FIG. 1 when appropriate, but the use of the singular does not limit the discussion to only one of each component. As described herein, the system 100 generally can be used to generate prompts or alerts according to some implementations of the present disclosure.

The control system 190 includes one or more processors. As such, the control system 190 can include any suitable number of processors (e.g., one processor, two processors, five processors, ten processors, etc.). In some implementations, the control system 190 includes one or more processors, one or more memory devices (e.g., the memory device 180, or a different memory device), one or more other electronic components (e.g., one or more electronic chips/components, one or more printed circuit boards, one or more power units, one or more graphical processing units, one or more input devices, one or more output devices, one or more secondary storage devices, one or more primary storage devices, etc.), or any combination thereof. In some implementations, the control system 190 includes the memory device 180 or a different memory device, yet in other implementations, the memory device 180 is separate and distinct from the control system 190, but in communication with the control system 190.

The control system 190 generally controls the various components of the system 100 and/or analyzes data obtained and/or generated by the components of the system 100. The control system 190 executes machine readable instructions that are stored in the memory 180 or a different memory device. The control system 190 can implement one or more engines of the system 100. An engine is a combination of hardware and software configured to perform specific functionality. The one or more processors of the control system 190 can be general or special purpose processors and/or microprocessors.

While the control system 190 is described and depicted in FIG. 1 as being a separate and distinct component of the system 100, in some implementations, the control system 190 is integrated in and/or directly coupled to the user device 102. The control system 190 can be coupled to and/or positioned within a housing of the user device 102 or any combination thereof. The control system 190 can be centralized (within one housing) or decentralized (within two or more physically distinct housings).

While the system 100 is shown as including a single memory device 180, it is contemplated that the system 100 can include any suitable number of memory devices (e.g., one memory device, two memory devices, five memory devices, ten memory devices, etc.). The memory device 180 can be any suitable computer readable storage device or media, such as, for example, a random or serial access memory device, a hard drive, a solid state drive, a flash memory device, etc. The memory device 180 can be coupled to and/or positioned within a housing of the user device 102.

The memory device 180 can be centralized (within one housing) or decentralized (within two or more physically distinct housings).

The user device 102 can include a mobile phone, a personal digital assistant, a tablet, a laptop computer, a smart television, a monitor, a terminal, or any combination thereof.

Figure 2:
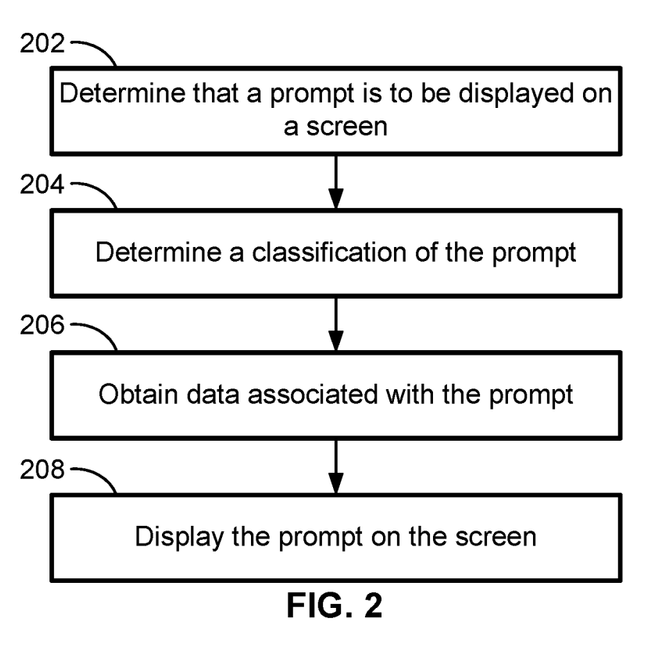
FIG. 2 is a process flow diagram for a method of displaying a prompt on a screen, according to some implementations of the present disclosure.

Referring to FIG. 2, a method for displaying a prompt on a screen of the user device 102 is illustrated. One or more of the steps of the method in FIG. 2 described herein can be implemented using the system 100 of FIG. 1. At step 202, the control system 190 and/or the user device 102 determines that a prompt is to be displayed on the screen of the user device 102. In some implementations, the control system 190 and/or the user device 102 can determine that the prompt to be displayed is for receiving an input is to be received from the user of the user device 102. For example, the prompt to be displayed can be a prompt for asking the user: (1) whether a certain task has been completed, (2) whether a certain action from a list of actions should be queued in a task list, (3) for a rating or feedback regarding a completed or a pending task, or (4) any combination thereof. In some implementations, the control system 190 and/or the user device 102 can determine that the prompt to be displayed is for providing information to the user of the user device 102. In some implementations, the control system 190 and/or the user device 102 can determine that the prompt is to be displayed due to an action of the user of the user device 102. For example, within a workflow the user device 102 can provide predefined actions that the user should take, and when the user disregards or contracts the predefined actions, the control system 190 and/or user device 102 can determine that the prompt is to be displayed. The predefined actions can include recommended actions of different weightings, e.g., suggested actions, required actions, forgotten actions, optional actions, etc.

At step 204, the control system 190 and/or the user device 102 determines a classification of the prompt to be displayed. The classification of the prompt to be displayed can be based at least in part on: (a) information to be presented to the user of the user device 102, (b) context associated with a current use of the user device 102 by the user, (c) a level of user attention required for the information to be contained in the prompt, (d) a level of user action required for the information contained in the prompt, (e) a timing of the prompt within a workflow, (f) a count number for the prompt, (g) an association of the prompt with content currently presented on the screen of the user device 102, (h) a user preference and/or a user profile (e.g., including captured user behavior) of a user using the user device 102, or (i) any combination thereof. The classification of the prompt to be displayed can be placed along a continuum describing a level of intrusiveness. The classification of the prompt speaks to an importance level surrounding a behavior of the prompt. For example, first prompt is a pop-up window that automatically closes within one, five, or ten seconds and a second prompt is a pop-up window that closes only when a user clicks on the prompt. Although both the first and second prompts are pop-up windows, that is, both are a same type of prompt, due to behavior, the second prompt is classified as being relatively more important than the first prompt.

In some implementations, information to be presented to the user of the user device 102 is of a relatively high importance, hence the prompt is classified as being of high importance. For example, in a hospital setting, a prompt alerting a nurse of a malfunction of a life support machine is of higher importance than a prompt alerting the nurse of his lunch break. As such information to be presented to the nurse can determine how the prompt is classified on a level of importance continuum.

In some implementations, context associated with a current use of the user device 102 by the user influences the classification of the prompt to be displayed. For example, if the user device 102 is currently being used by the user for activities not pertaining to the prompt to be displayed, the prompt to be displayed can be classified as being less important or more important compared to the activities currently being undertaken by the user. In another example, if the user device 102 is currently being used by the user for activities relating to the prompt to be displayed, the prompt to be displayed can be classified as being more important due to its relevance to the user's current activities. In another example, if the user device 102 is rarely used by the user or the user device 102 is not currently being used by the user, then the prompt to be displayed can be classified as being of relatively higher importance along the importance continuum. In another example, if the user device 102 is being used by the user, then the prompt to be displayed can be classified as being of relatively lower importance along the importance continuum since the user is likely to see the prompt when displayed.

In some implementations, a level of user attention required for the information to be included in the prompt influences the classification of the prompt. If a relatively higher level of engagement by the user to the information is sought, then the control system 190 and/or the user device 102 can classify the prompt as being of a higher importance than a prompt with a relatively lower level of engagement by the user. For example, if the prompt to be displayed on the user device 102 is a legal acknowledgment of assuming liability and the user is provided with varying options, then the user's attention to the different options available is desired. As such, the prompt to be displayed is classified as being of a higher importance. In another example, a prompt confirming a user's choice before a purchase can be classified as being of relatively high importance. Engagement is used here broadly and can include reading or obtaining the information in order to succeed in a next stage of a workflow, having to provide a response or acknowledgment to the information, etc.

In some implementations, a level of user action required for the information contained in the prompt influences the classification of the prompt. Similar to the level of user attention required, if a relatively higher level of user action is sought, then the control system 190 and/or the user device 102 can classify the prompt as being of a higher importance than a prompt with a relatively lower level of user action. For example, a prompt informing a nurse to change sheets of a patient can be of a relatively higher importance than a prompt informing the nurse that the patient is asleep. In the former, the nurse is required to perform an action while in the latter, the nurse is only required to be informed and not perform any specific actions. As such, the prompt requiring an action can be classified as being relatively more important than the prompt not requiring any specific actions.

In some implementations, a timing of the prompt within a workflow influences the classification of the prompt. For example, a workflow for placing an order for a drug on a website can include entering a string to perform a text-based search for the drug, receiving a table listing of results, selecting the drug from the table listing of results to add to cart, and checking out. Side effects of the drug being displayed at different stages of the workflow can be classified under varying levels of importance. For example, at the results stage, small icons can be used to provide side effect information, at the selection stage an inline alert can be used to provide the side effect information, and at the checkout stage a modal with acknowledgement can be used to provide the side effect information.

In the previous example, an increasing level of importance is given to the prompt giving the side effect information at each stage of the workflow. A listing of results can include more extraneous information than needed, thus side effect information can be placed in the background. After selecting the drug at the selection stage, the user can still remove the drug from cart so although there is a higher level of commitment in the search stage, the user is still not at the stage of getting the drug. As such, the side effect information can be determined to be more important than in the search stage. At the checkout stage, the user has committed and as such, the side effect information is determined to be very important to ensure that the user considered the information, in case the user did not pay very close attention in earlier stages. A prompt to be provided can thus be classified under different levels of importance based on when the prompt is provided to the user in a workflow.

In some implementations, a count number for the prompt to be displayed influences the classification of the prompt. A count number for the prompt to be displayed can be a number of times the prompt to be displayed has actually been displayed within a workflow. For example, in an office environment where multiple individuals are editing a same document at different terminals, these individuals can separate the document into sections where each individual works on a different section. For a specific individual, whenever another individual saves or commits changes to the document, a prompt can be displayed that the document has changed and whether the specific individual wants to refresh the document to incorporate the changes. The control system 190 and/or the user device 102 can determine by counting a number of times a prompt like this is generated to classify the prompt as being relatively less important compared to other prompts.

In some implementations, a count number for the prompt to be displayed can be a number of times that the user has disregarded one or more graphical user interface elements associated with prompts, similar to or the same as, the prompt to be displayed. At least initially, the one or more graphical user interface elements associated with prompts are displayed with a same level of intrusiveness. For example, a patient has a habit of ordering drugs online following the workflow provided above. The patient is never responsive to any of the prompts provided until the checkout stage where the side effect information is very prominent. At this stage, the patient aborts the purchase and restarts the search for a different drug. The control system 190 and/or the user device 102 can use pattern recognition and machine learning algorithms to determine that the patient does not seem to pay much attention to the side effect information until the checkout stage. The control system 190 and/or the user device 102 can count a number of times that the patient has followed this pattern of not paying much attention to the side effect information. This number of times can be used to classify earlier prompts in the workflow as much less important compared to the prompt provided at the end of the workflow. In some implementations, the number of times that the patient has followed the pattern of not paying much attention to the side effect information can be used to adjust subsequent prompts such that earlier prompts in the workflow are classified as being more important than in the initial case. As such, the control system 190 and/or the user device 102 can adjust the intrusiveness and/or the importance accordingly, based at least in part on the importance associated with the earlier prompts determined using the pattern recognition and machine learning algorithms described herein.

In some implementations, a user preference and/or a user profile of the user that is using the user device 102 influences the classification of the prompt to be displayed. For example, the user profile can include an age of the user, how long the user has used the system 100, an experience of the user in implementing a specific workflow which the system 100 is generating prompts for, demographic information of the user, or any combination thereof. User preferences can include custom settings of the system 100, for example, preferences involving which types of prompts should not be displayed on the screen of the user device 102, how certain prompts should be displayed on the screen, etc. The control system 190 and/or the user device 102 can check the user preferences and/or the user profile to determine the classification of the prompt to be displayed. The control system 190 and/or the user device 102 can affect importance (thus classification) of the prompt by demoting or promoting the prompt in importance, based on the user preferences and/or the user profile.

In some implementations, the control system 190 and/or the user device 102 can determine that the user preferences prohibit or discourage classifying the prompt to be displayed as being relatively important or as being relatively unimportant. The control system 190 and/or the user device 102 can override the user preferences, classifying the prompt to be displayed as relatively unimportant or as relatively important. The control system 190 and/or the user device 102 can also override user preferences in regards to how certain prompts are displayed on the user device 102. For example, if the user indicates that flashing prompts are not preferred and should not be displayed on the user device 102, the control system 190 and/or the user device 102 can override this setting in an instance where the user has ignored a prompt for an extended amount of time (e.g., three minutes, five minutes, twenty minutes, two hours, etc.).

In some implementations, the user profile can include user behavior. The user device 102 and/or the control system 190 can track how long the user spends reading a prompt before the user takes an action. For example, the user device 102 displays a prompt, and within seconds, the user acknowledges the prompt. The user device 102 and/or the control system 190 can monitor these reflexive acknowledgments to determine whether the user is actually internalizing the information contained in the prompts. When the number of reflexive acknowledgments exceed a reflexive acknowledgements threshold, the user device 102 and/or the control system 190 can determine that the user has a relative low level of consideration of the prompts.

Similarly, the user device 102 and/or the control system 190 can determine a number of times the user uses an aggregate action like a "check all" option or a "dismiss all" option to dismiss prompts. When the number of times the user uses an aggregate action exceeds an aggregate action threshold, the control system and/or the user device 102 can determine that the user has a relatively low level of consideration of prompts. User behavior can show disregard or inconsideration to prompts in general, or to specific prompts. The control system 190 and/or the user device 102 can classify the prompt to be displayed as relatively more important. A relatively more important prompt can include graphical user interface elements that prevent ignoring the prompt or using an aggregate action to dismiss the prompt.

In some implementations, the number of time the user uses an aggregate action and/or the number of reflexive acknowledgements can be used to train a machine learning algorithm. Thresholds or patterns can be recognized using the machine learning algorithm such that the classification of the prompt to be displayed can be determined from the trained machine learning algorithm.

At step 206, the user device 102 and/or the control system 190 obtains data associated with the prompt to be displayed. In some implementations, the user device 102 and/or the control system 190 creates the data associated with the prompt to be displayed. For example, from the classification of the prompt to be displayed, the user device 102 and/or the control system 190 generates data associated with the prompt. The data associated with the prompt can include a type of prompt, layout of information to be included in the prompt, graphical user interface elements to be included in the prompt, whether the prompt will include an aggregate action, when to display the prompt, a level of intrusiveness of the prompt, an area of the screen of the user device 102 to display the prompt, or any combination thereof. Examples of graphical user interface elements include at least one icon, at least one badge, at least one inline message, at least one toast message, at least one header alert, at least one notice popup, at least one acknowledgment popup, etc.

In some implementations, where the control system 190 represents a remote device, the user device 102 receives the data associated with the prompt to be displayed. For example, the user device 102 can receive the data associated with the prompt from the control system 190 including a database, a remote server, a cloud server, or any combination thereof. The data associated with the prompt to be displayed can be generated by the control system 190 based on the classification of the prompt to be displayed.

At step 208, the user device 102 and/or the control system 190 displays the prompt to be displayed on the screen of the user device 102. The data associated with the prompt to be displayed from step 206 includes parameters associated with the prompt. The user device 102 and/or the control system 190 displays the prompt on the screen of the user device 102 according to these parameters.

Figure 3:
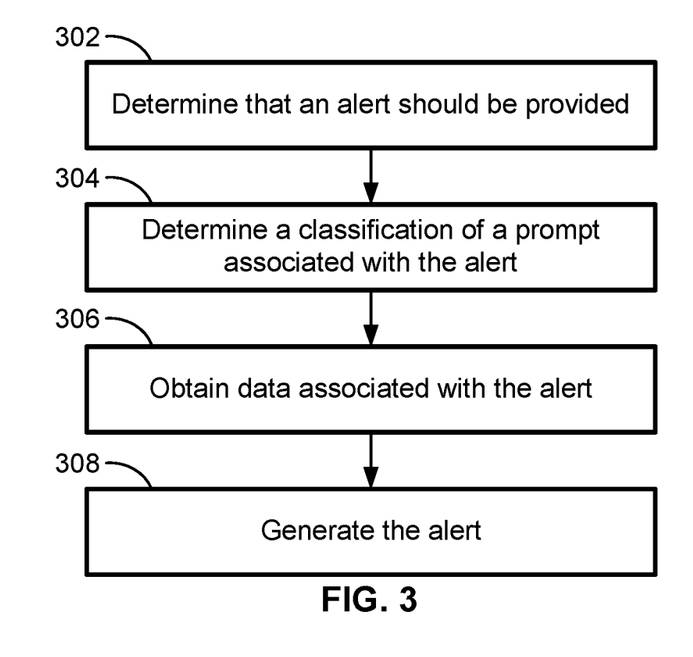
FIG. 3 is a process flow diagram for a method of generating an alert, according to some implementations of the present disclosure.

A prompt can be accompanied by other types of data and not just visual or graphical user interface elements. A prompt can be associated with an alert, where an alert provides a signal to the user of the user device 102. Referring to FIG. 3, a method of generating an alert according to some implementations of the present disclosure is provided. At step 302, the user device 102 and/or the control system determines that an alert should be provided. The determination that an alert should be provided can be analogous to that of determining that a prompt is to be displayed on a screen as described in connection with step 202 of FIG. 2. In addition, the determination that an alert should be provided can be based on a prompt being displayed on the user device 102, and the user has not acknowledged the prompt within a time duration. The time duration can be two minutes, three minutes, ten minutes, twenty minutes, an hour, four hours, etc.

Examples of alerts include one or more visual alerts, one or more auditory alerts, one or more tactile alerts, etc. In some implementations, a visual alert is a blinking or flashing of the screen of the user device 102 or a light emitting diode (LED) on the user device 102. A visual alert can also include activating a camera flash on the user device 102. A visual alert can also include displaying an object in an augmented reality view or providing three dimensional visualizations on the screen of the user device 102. In some implementations, an auditory alert includes playing music from a speaker on the user device 102, playing a sound from the speaker on the user device 102, and/or sounding an alarm using the speaker on the user device 102. In some implementations, tactile alerts include turning on a vibration motor of the user device 102 causing the user device 102 to vibrate.

At step 304, the user device 102 and/or the control system 190 determines a classification of a prompt associated with the alert. Step 304 is similar to or analogous to step 204 previously discussed above in connection to FIG. 2. Classification of a prompt is a measure of a relative importance of the prompt compared to other prompts. Similarly, the relative importance of the prompt can be extended to the alert to be provided. That is, the prompt associated with the alert can be classified as being relatively important, hence an importance associated with the alert can match that of the prompt. A level of intrusiveness of a prompt can correlate with the relative importance of the prompt, and similarly, a level of intrusiveness of the alert can correlate with the relative importance of the alert.

In some implementations, for a visual alert, a relatively less important visual alert is provided with a lower brightness and/or with a lower number of color combinations than a relatively more important visual alert. For an auditory alert, a relatively less important auditory alert can be provided in a shorter duration and/or a lower volume when compared to a relatively more important auditory alert. For a tactile alert, a relatively less important tactile alert can be provided in a shorter duration and/or a lower vibration vigor when compared to a relatively more important auditory alert. Overall, a magnitude of a visual alert, auditory alert, or tactile alert can be defined to describe and compare relatively high importance and relatively low importance of the alerts along different dimensions associated with the alerts. Dimensions include, for example, brightness, colors, duration, volume, vigor, etc.

In some implementations, a level of intrusiveness of the alert to be provided is increased in response to the user of the user device 102 not responding to previous alerts. Alerts with larger magnitudes are determined to be relatively more intrusive than alerts with smaller magnitudes. As such, a magnitude of the alert to be provided can be increased in response to the user of the user device 102 not responding to previous alerts.

In some implementations, a tactile alert can be less noticeable than an auditory alert so alert types can be provided on a continuum of importance and a continuum of intrusiveness. For example, when the user of the user device 102 fails to respond to previous tactile alerts, then the user device 102 and/or the control system 190 can determine that the alert to be provided should be an auditory alert. In some implementations, the user device 102 and/or the control system 190 determines that the auditory alert should be provided in combination with a tactile alert, a visual alert, or any combination thereof.

In some implementations, the user device 102 and/or the control system 190 can update a classification of the prompt associated with the alert based on user behavior indicating that the user of the user device 102 is ignoring (or is responsive to) previous alerts. The updated classification of the prompt associated with the alert can effect an updated alert. Where the updated alert is a less intrusive alert when the user is responsive to previous alerts, or is a more intrusive alert when the user is ignoring the previous alerts.

At step 306, the user device 102 and/or the control system 190 obtains data associated with the alert to be provided. In some implementations, the user device 102 and/or the control system 190 generates the data associated with the alert to be provided. For example, from the classification of the prompt associated with the alert to be provided, the user device 102 and/or the control system 190 generates data associated with the alert. The data associated with the prompt can include a type of alert, magnitude of the alert, when to provide the alert (whether the alert should be provided after the prompt, before the prompt, or simultaneously with the prompt), a level of intrusiveness of the alert, or any combination thereof.

In some implementations, where the control system 190 represents a remote device, the user device 102 receives the data associated with the alert to be provided. For example, the user device 102 can receive the data associated with the alert from the control system 190 including a database, a remote server, a cloud server, or any combination thereof. The data associated with the alert to be provided can be generated by the control system 190 based on the classification of the prompt to be displayed as described in connection with step 304.

At step 308, the user device 102 and/or the control system 190 generates the alert. The data associated with the alert to be provided from step 306 includes parameters associated with the alert. The user device 102 and/or the control system 190 generates the alert on the screen of the user device 102 according to these parameters.

Some implementations of the present disclosure can be used in several applications in a healthcare environment. In a first example, event-based progress notes can be realized. In a workflow where a nurse adds a diagnosis code to his mobile phone, the mobile phone can inquire whether to add a progress note for the added diagnosis code. If the nurse ignores the prompt, a more stern prompt can be provided, displaying "It is strongly recommended that you document nursing care as this will result in better quality and financial outcomes for your nursing facility."

In a second example, comparison and recommendation of diagnoses codes based on health insurance reimbursement categories can be realized. If a nurse chooses a specific diagnosis code for a resident, the user device 102 and/or the control system 190 can ask the nurse to reconsider their original choice of diagnosis code in order to result in better outcomes from a quality and financial perspective. As an example, the user device 102 and/or the control system 190 can prompt the nurse to choose a different and/or more specific diagnostic code that represent a similar diagnosis. As another example, generally, a patient has many diagnoses that a physician has already identified. Therefore, in some implementations, the user device 102 and/or the control system 190 can prompt the nurse to select a diagnosis, from the many diagnoses, that pays the most.

In a third example, proactive alerting of medications can be realized. A user can be alerted to safety hazards as the user searches for medications. The user device 102 and/or the control system 190 can alert the user to patient safety issues, for example, by including drug to drug interactions, drug to allergy interactions, etc. Based on the user's attention to detail (user behavior), an intrusiveness of the prompts and/or alerts can be increased over time to elicit user engagement.

Figure 4:
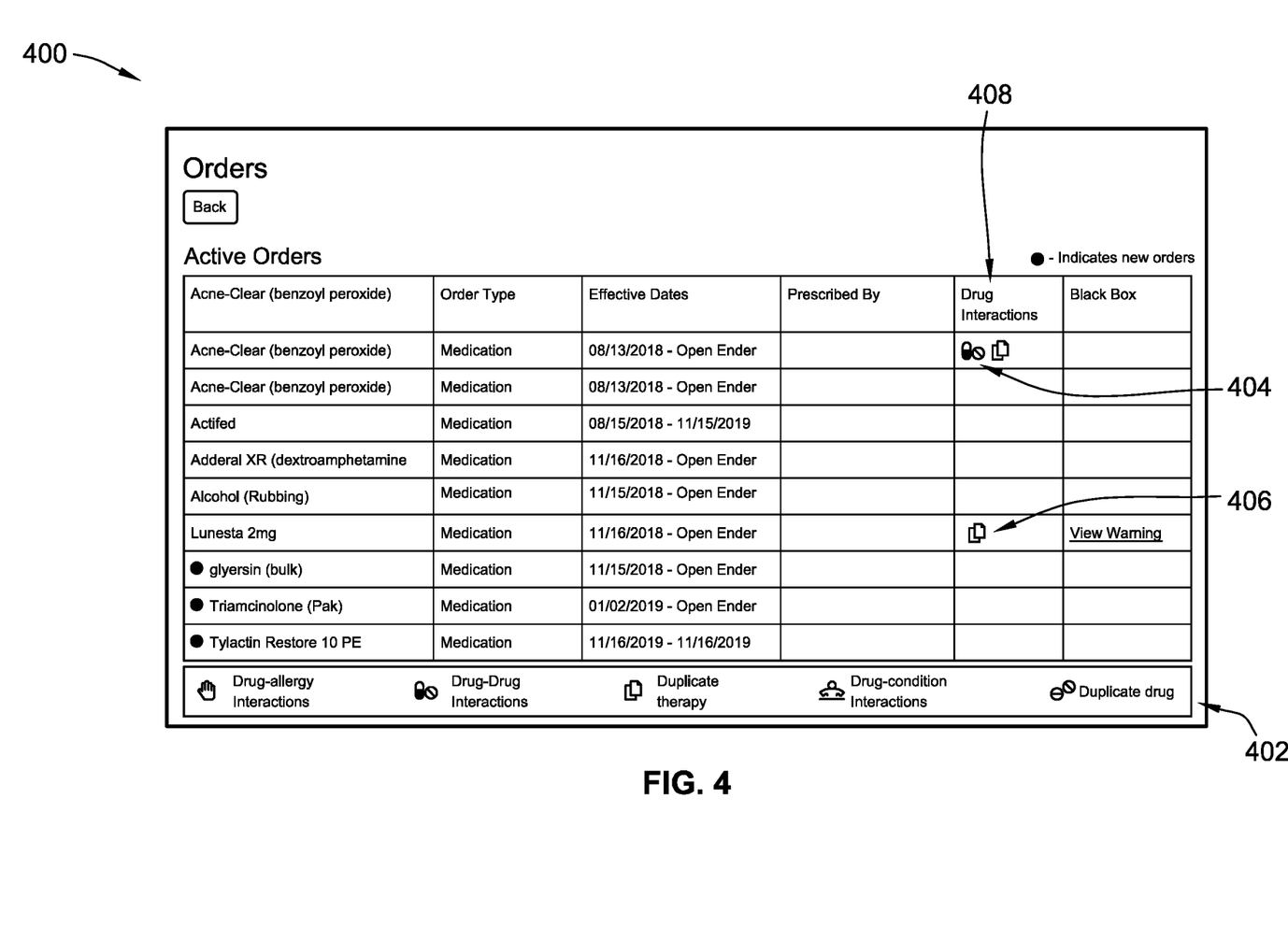
FIG. 4 illustrates use of icons, according to some implementations of the present disclosure.

FIGS. 4-10 provide specific graphical user interface element examples for use in a healthcare environment, according to some implementations of the present disclosure. Level of intrusiveness is provided in the description below for each graphical user interface element example. The discussion on the level of intrusiveness is dependent on actual implementation. In FIG. 4, a screenshot 400 of a list of active orders is provided. The screenshot 400 shows the active drug orders in a table format. The active drug orders provide some information in text. The screenshot 400 also shows a legend 402 that describes meanings of icons and displays at least two types of badges or icons 404 and 406 under the drug interactions column 408 of the active drug orders table. The icons 404 and 406 quickly convey information that a health specialist should double check. The icons 404 and 406 appear beside specific content to indicate a status or provide extra information. A level of intrusiveness of the icons 404 and 406 is minimal as the icons 404 and 406 do not take up much room in the table. Furthermore, the icons 404 and 406 do not require user interaction or acknowledgement.

Figure 5:
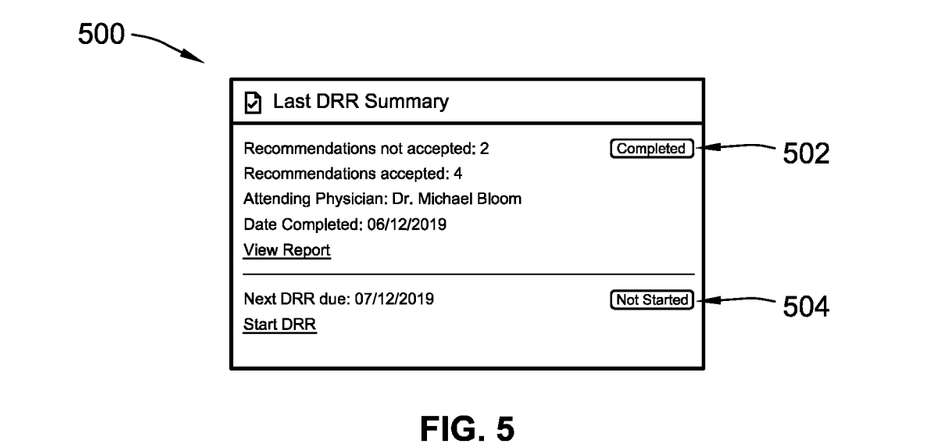
FIG. 5 illustrates use of badges, according to some implementations of the present disclosure.

In FIG. 5, a badge 500 indicating a status is provided according to some implementations of the present disclosure. The badge 500 can show status 502 as being completed and status 504 as not yet started. Status symbols that convey different information can differ to quickly provide the information to a user. The status 502 can be displayed in a different color or shading than status 504. The status 502 can be displayed in a different font than status 504. A level of intrusiveness of the badge 500 is higher than that of the icons 404 and 406 above since the badge 500 takes up more room than the icons 404 and 406.

Figure 6A:
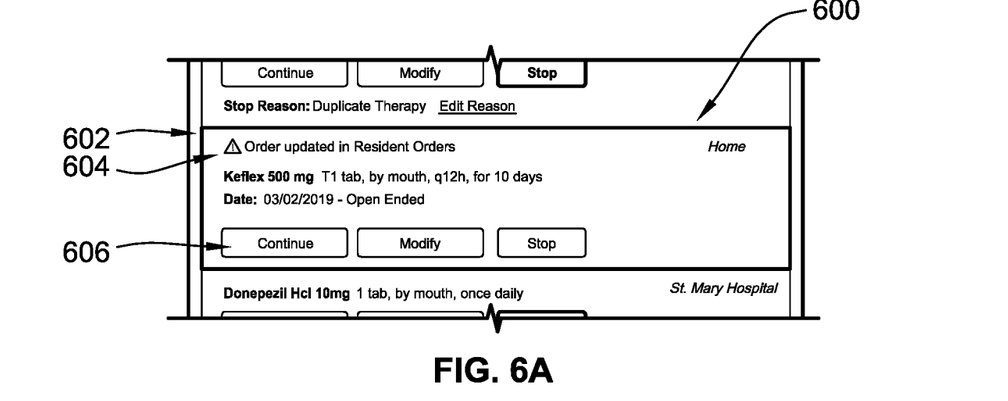
FIG. 6A illustrates inline messages, according to some implementations of the present disclosure.
Figure 6B:
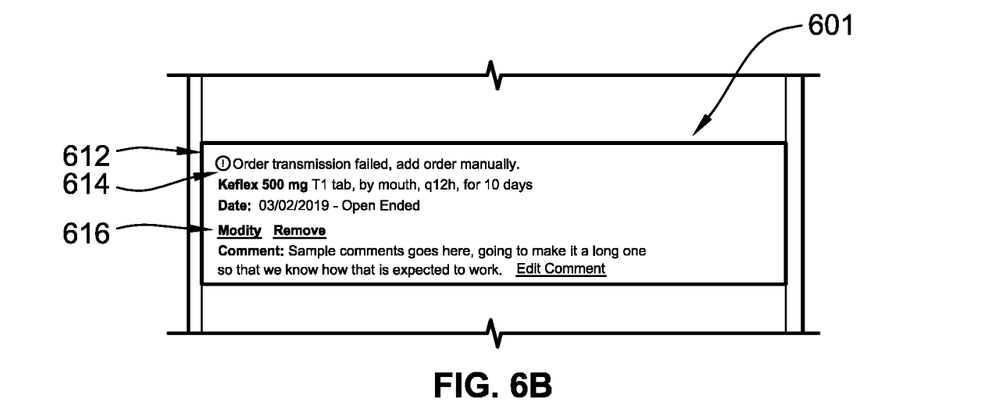
FIG. 6B illustrates other inline messages, according to some other implementations of the present disclosure.

In FIG. 6A, an inline message 600 is provided, and in FIG. 6B, an inline message 601 is provided. The inline message 600 can include a border 602, and the inline message 601 can include a border 612. The inline message 600 can include a status symbol 604 along with text and one or more links (e.g., a button 606) for the user to interact with the displayed inline message 600. Similarly, the inline message 601 can include a status symbol 614 and one or more links (e.g., a link 616) for the user to interact with the displayed inline message 601. Inline messages can appear besides or under specific elements as information text with an icon and are minimally intrusive and do not interrupt the user. Inline messages can be used for supplementary information or if the user is found to be giving the appropriate consideration to the content. A level of intrusiveness of the inline messages 600 and 601 is similar to that of the badge 500.

Figure 7:
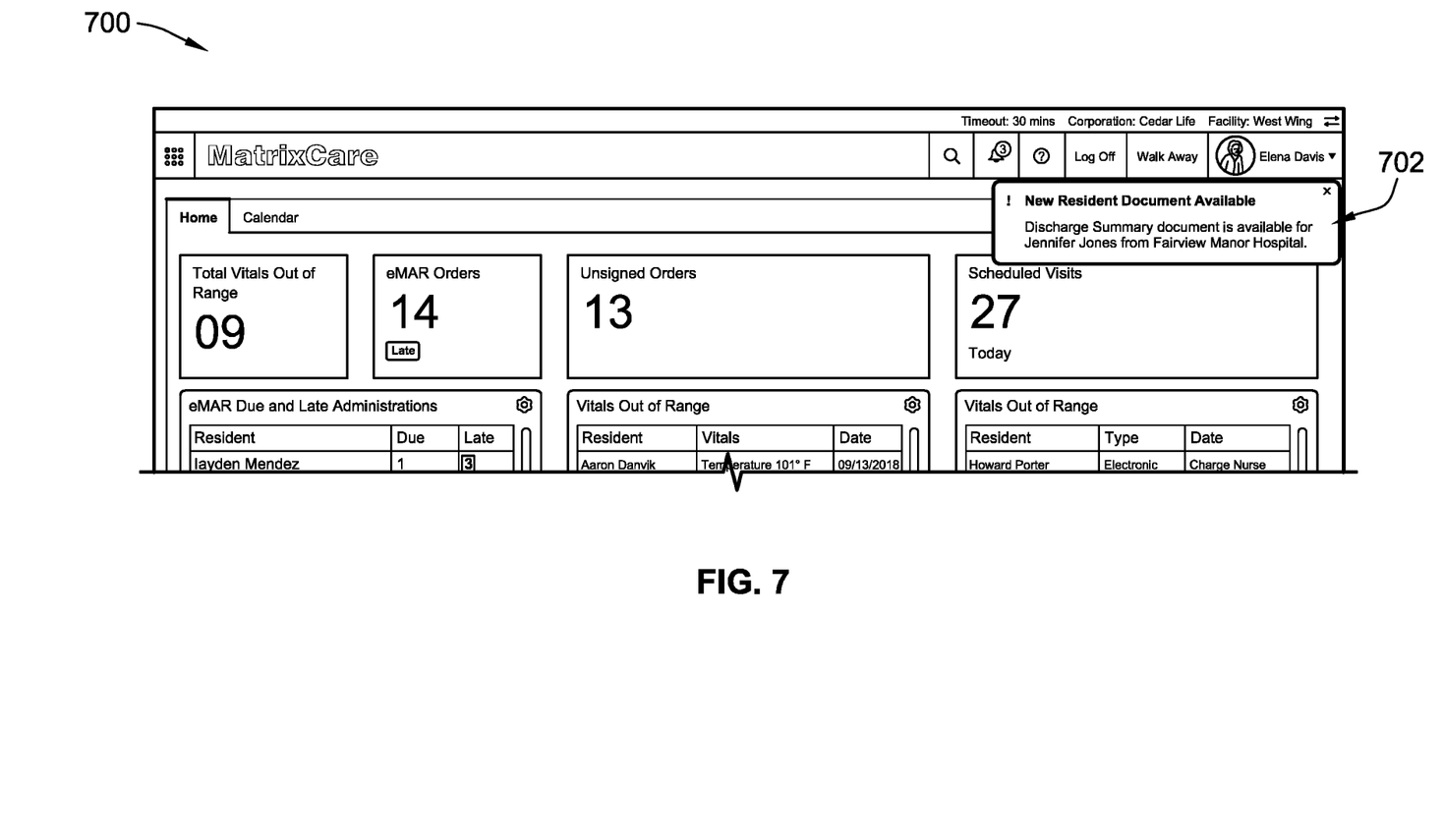
FIG. 7 illustrates a toast message, according to some implementations of the present disclosure.

In FIG. 7, a screenshot 700 which includes a toast message 702 is provided according to some implementations of the present disclosure. Toast messages slide out and overlay content that the user is looking at. For example, the toast message 702 appears at the top of the page on top of the page content. The toast message 702 will not stop the user's workflow and is dismissible. The toast message 702 has more visual prominence on the page than the inline messages discussed above in connection with FIGS. 6A and 6B. Toast messages can be used to notify the user of changes or warnings. Toast messages can be used as a secondary method of notification if inline messages are ignored or if the user does not give due consideration after displaying inline messages. Toast message 702 is more intrusive compared to the inline messages 600 and 601 because it overlay contents on the page and the user has to dismiss it. In some implementations, the toast message 702 is auto-dismissed after a pre-determined period of time. In some implementations, the toast message 702 is manually dismissible (e.g., before an auto-dismiss timer, or there is no auto-dismiss timer).

Figure 8:
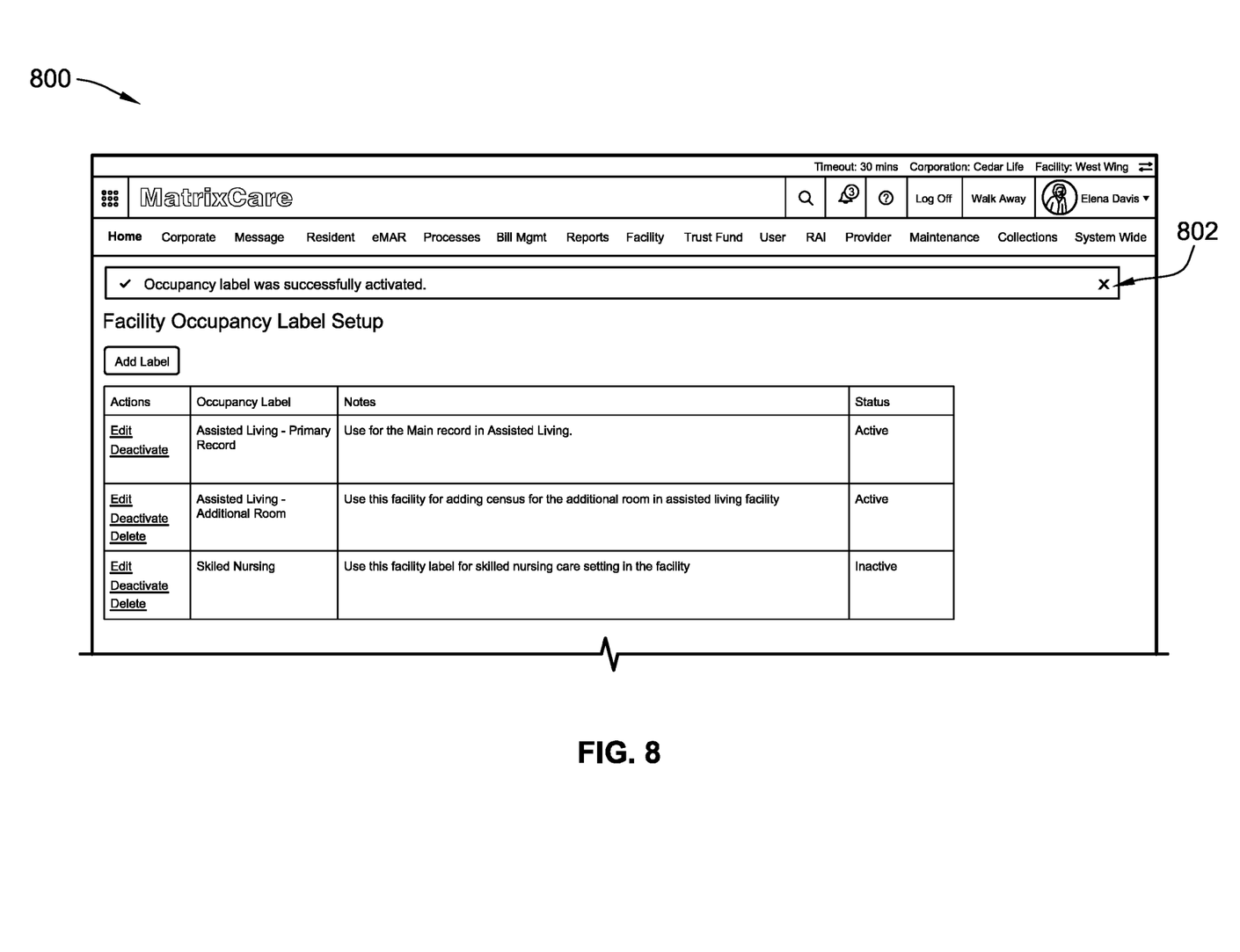
FIG. 8 illustrates an on-page alert, according to some implementations of the present disclosure.

In FIG. 8, a screenshot 800 which includes an on-page alert 802 is provided according to some implementations of the present disclosure. On-page alerts appear at the top of a page and do not stop the user's workflow. On-page alerts may or may not be dismissible. For example, the on-page alert 802 appears at the top of the page above the page content. On-page alerts can also be used to display asynchronous changes to the system that may occur when the user is away. The asynchronous changes may occur due to others making changes on a shared platform. The on-page alert 802 will not stop the user's workflow. The on-page alert 802 has a similar visual prominence on the page than the toast message 702 discussed above in connection with FIG. 7, even though the on-page alert 802 is not as intrusive as the toast message 702.

Figure 9:
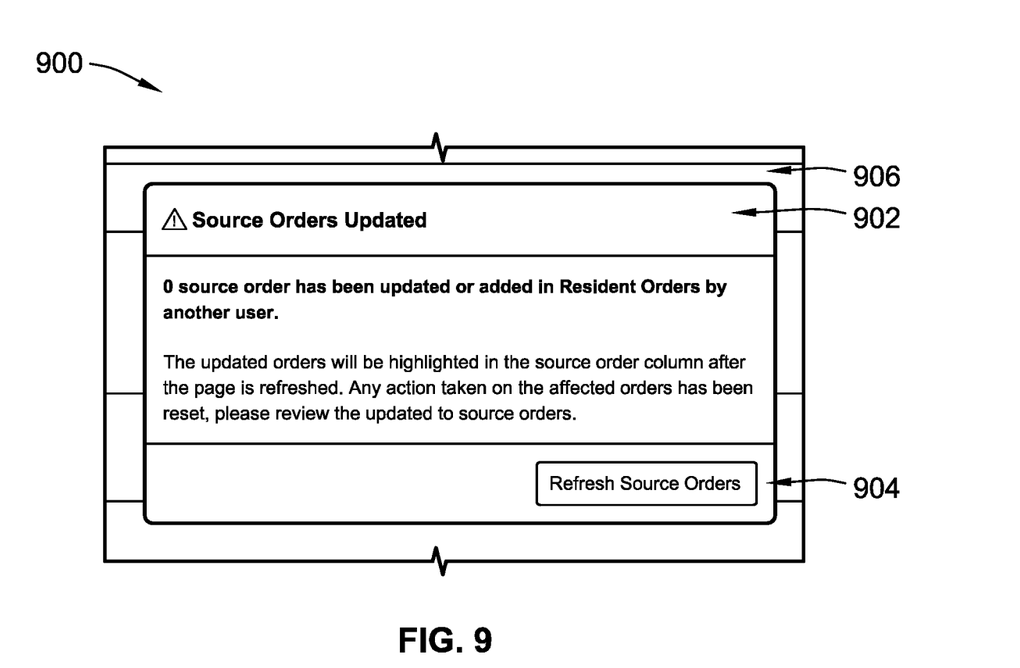
FIG. 9 illustrates a first example of modal warning, according to some implementations of the present disclosure.
Figure 10:
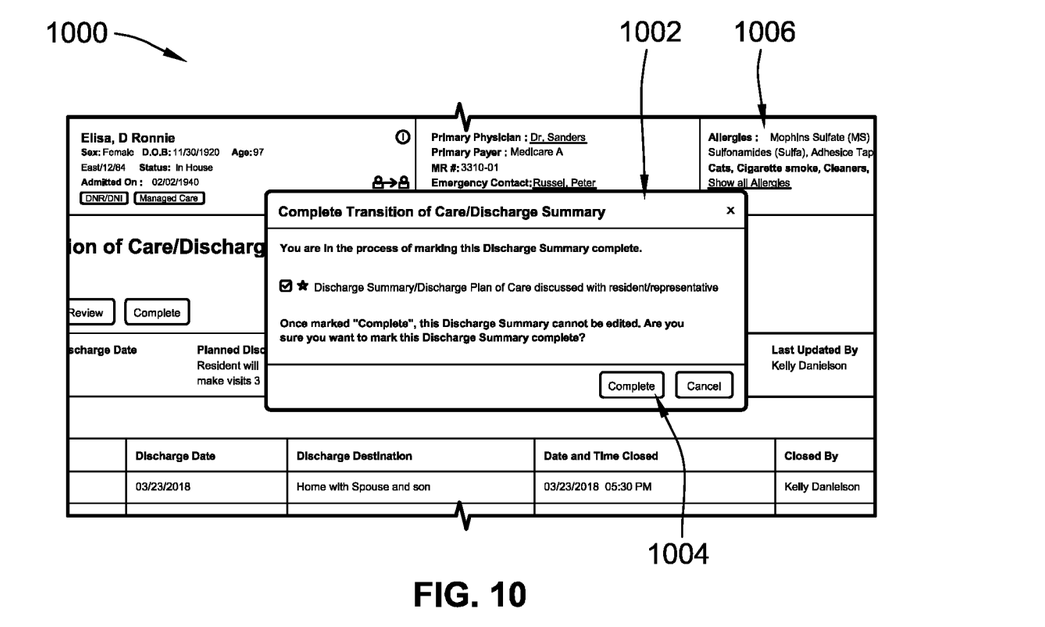
FIG. 10 illustrates a second example of modal warning, according to some implementations of the present disclosure.

FIGS. 9 and 10 illustrate two non-mutually exclusive examples of modal warning according to some implementations of the present disclosure. Modal warnings appear as an overlay on a page and stops the user from taking any action on the page. Modal warnings are highly intrusive and can be used to indicate important warnings or changes in status. For example, FIG. 9 shows a screenshot 900 of a page with an overlaid modal warning 902. The modal warning 902 includes a link (button 904) that the user must interact with before being able to go back to work on the page 906.

FIG. 10 shows a screenshot 1000 of a page with an overlaid modal warning 1002. The modal warning 1002 includes two links (e.g., button 1004) that the user must interact with before being able to go back to work on the page 1006. The modal warning 1002 is a modal warning with acknowledgement which requires the user to take a specific action before allowing the user to proceed with his workflow. Modal warnings with acknowledgements can be used to command the user's attention toward something specific and can have content related to signing off on decisions or choices made.

Some implementations of the present disclosure provide an alerting system for providing one or more alerts and/or prompts using various factors. The alerting system can use content type to determine which type of prompt and/or alert to provide. For example, icons and badges can be used to convey very limited information but they might not be a good choice for communicating complex information. Icons and badges can work well to communicate status and to draw the user's attention to specific areas of a screen of the user device 102. For more complex information, other types of prompts can be more effective. For content specific to a single component of a particular area of the screen, inline messages, icons, and badges are better. In some implementations, the icons and badges can provide a mechanism (e.g., a clickable item) that allows the user to view the complex information that is not apparent from the icons and badges.

The alerting system can use timing to determine which type of prompt and/or alert to provide. If alerting the user prospectively, the type of prompt and/or alert can be less intrusive. The intrusiveness can increase as the workflow progresses. For example, drug interactions can be shown as an icon during drug search, shown as an on-page or inline message during order writing, and finally shown as a modal with acknowledgement before order submission. Furthermore, the alerting system can use content importance to determine which type of prompt and/or alert to provide. For example, more important content can benefit from a more intrusive prompt and/or alert, thus a level of importance being positively correlated with a level of intrusiveness.

The alerting system can use user preferences and/or user behavior to determine which type of prompt and/or alert to provide. The alerting system can monitor for reflex actions, a number of times prospective alerts are ignored, a number of times aggregate actions are taken, etc. Furthermore, the alerting system can use repetition to determine which type of alert to provide. If an alert is expected to be provided or a prompt is expected to be displayed every time a user completes a certain workflow, and the user is expected to complete the workflow several times within a session, then the intrusiveness of the alert or prompt provided can be subsequently adjusted to decrease friction.

Some implementations of the present disclosure provide an alerting system with variable intrusiveness of alerts and/or prompts that request certain intervention from a user. Variable intrusiveness allows the alerting system to ensure that adequate acknowledgement and consideration of information is displayed to the user. Variable intrusiveness decreases a chance of an error in a workflow and increases quality of data recorded or action taken while implementing the workflow. Variable intrusiveness lends itself to quality improvements using machine learning algorithms. Machine learning algorithms can help improve the quality of recommendations when text or notifications are generated by the alerting system in the future. That is, the alerting system can learn interactively over time and can improve quality of outcomes by improving prompts and alerts provided to the user. That way, user behavior can be used to increase level of engagement and prompting to ensure that the user is fully aware of details included in the prompts or fully aware of significance of the alerts.

One or more elements or aspects or steps, or any portion(s) thereof, from one or more of any of claims 1-26 below can be combined with one or more elements or aspects or steps, or any portion(s) thereof, from one or more of any of the other claims 1-26 or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A method comprising:
   determining an initiation of a prompt to be displayed on a display of a user device to present information to a user of the user device, to receive an input from the user of the user device, or a combination thereof;
   receiving a number of reflexive acknowledgements of previous prompts similar to the prompt to be displayed, wherein the number of reflexive acknowledgements exceeding an acknowledgements threshold indicates the prompt as less important;
   determining a classification of the prompt on an importance continuum based, at least in part, on the number of reflexive acknowledgements, the information to be presented, the input to be received, and context associated with current engagement of information on the user device by the user; and
   causing, at least in part, a presentation of a graphical user interface element on the display of the user device based, at least in part, on the classification of the prompt.

2. The method of claim 1, wherein the classification of the prompt is further based, at least in part, on a level of user attention required, a level of user action required, a timing of the prompt within a workflow, a count number for the prompt, an association of the prompt with content currently presented on the display, or a combination thereof.

3. The method of claim 2, wherein the count number for the prompt is either (i) a number of times the prompt has occurred within the workflow or (ii) a number of times the user has disregarded one or more prior graphical user interface elements associated with the prompt.

4. The method of claim 1, further comprising:
determining a number of previous prompts that the user disregarded during a workflow,
wherein the classification of the prompt is further based, at least in part, on the number of the previous prompts.

5. The method of claim 4, wherein the previous prompts that the user disregarded during the workflow have a same classification as the prompt.

6. The method of claim 4, wherein the previous prompts that the user disregarded during the workflow have different classification as the prompt.

7. The method of claim 1, further comprising:
determining a level of consideration given by the user in response to the presentation of the graphical user interface element on the display.

8. The method of claim 7, wherein the level of consideration is based, at least in part, on a responsiveness of the user to the graphical user interface element, an interaction of the user with the graphical user interface element, or a combination thereof.

9. The method of claim 7, further comprising:
modifying the classification of the prompt based, at least in part, on the level of consideration.

10. The method of claim 1, wherein the graphical user interface element is at least one icon, at least one badge, at least one inline message, at least one toast message, at least one header alert, at least one notice popup, or at least one acknowledgement popup.

11. The method of claim 1, further comprising:
determining that the presentation of the graphical user interface element would conflict with a user preference; and
causing, at least in part, an overriding of the user preference for the presentation of the graphical user interface element.

12. The method of claim 1, further comprising:
determining an updated classification of the prompt based, at least in part, on user behavior in response to the presentation of the graphical user interface element on the display; and
causing, at least in part, a presentation of an updated graphical user interface element on the display of the user device based, at least in part, on the updated classification of the prompt.

13. The method of claim 1, wherein the initiation of the prompt is based, at least in part, on a user action of the user within a workflow contradicting a predefined action within the workflow.

14. The method of claim 13, wherein the predefined action includes a recommendation weighting, and the classification of the prompt is based, at least in part, on the recommendation weighting.

15. The method of claim 14, wherein an action type of the predefined action is one of a reminder action, a suggested action, a recommended action, or a required action, and the recommendation weighting is based on the action type.

16. A method comprising:
determining an initiation of a prompt to be provided to a user of a user device;
receiving a number of reflexive acknowledgements of previous prompts similar to the prompt to be displayed, wherein the number of reflexive acknowledgements exceeding an acknowledgements threshold indicates the prompt as less important;
determining a classification of the prompt on an importance continuum based, at least in part, on information associated with the prompt, the number of reflexive acknowledgements, a requirement for a response by the user to the prompt, and context associated with current engagement of information on the user device by the user; and
causing, at least in part, a providing of an alert at the user device based, at least in part, on the classification of the prompt.

17. The method of claim 16, wherein the alert is one or more visual alerts, one or more audible alerts, one or more tactile alerts, or a combination thereof.

18. The method of claim 17, further comprising:
causing, at least in part, an increasing intrusiveness of the alert based, at least in part, on the user not responding to the alert.

19. The method of claim 18, wherein the increasing intrusiveness is an increase in brightness of the alert as a visual alert, an increase in amplitude of the alert as an audible alert, an increase in magnitude of the alert as a tactile alert, or a combination thereof.

20. The method of claim 18, wherein the increasing intrusiveness is a change in mode of the alert, an addition of a mode of the alert, or a combination thereof.

21. The method of claim 16, wherein the classification of the prompt is based, at least in part, on a level of user attention required, a level of user action required, a timing of the prompt within a workflow, a count number for the prompt, an association of the prompt with content currently presented on the display, or a combination thereof.

22. The method of claim 21, wherein the count number for the prompt is either (i) a number of times the prompt has occurred within the workflow or (ii) a number of times the user has disregarded one or more previously provided alerts in response to the prompt.

23. A device comprising:
memory including one or more computer-readable instructions; and
a control system having one or more processors, the one or more processors configured to execute the one or more computer-readable instructions to:
determine an initiation of a prompt to be displayed on a display of a user device to present information to a user of the user device, to receive an input from the user of the user device, or a combination thereof;
receive a number of reflexive acknowledgements of previous prompts similar to the prompt to be displayed, wherein the number of reflexive acknowledgements exceeding an acknowledgements threshold indicates the prompt as less important;
determine a classification of the prompt on an importance continuum based, at least in part, on the number of reflexive acknowledgements, the information to be presented, the input to be received, and context associated with current engagement of information on the user device by the user; and
cause, at least in part, a presentation of a graphical user interface element on the display of the user device based, at least in part, on the classification of the prompt.

24. The device of claim 23, wherein the classification of the prompt is further based, at least in part, on a level of user attention required, a level of user action required, a timing of the prompt within a workflow, a count number for the prompt, an association of the prompt with content currently presented on the display, or a combination thereof.

25. The device of claim 24, wherein the count number for the prompt is either (i) a number of times the prompt has occurred within the workflow or (ii) a number of times the user has disregarded one or more prior graphical user interface elements associated with the prompt.

26. The device of claim 23, wherein the one or more processors are configured to execute the one or more computer-readable instructions to further:
  determine a number of previous prompts that the user disregarded during a workflow,
  wherein the classification of the prompt is further based, at least in part, on the number of the previous prompts.

* * * * *